United States Patent [19]
Loutfy et al.

[11] Patent Number: 6,113,673
[45] Date of Patent: Sep. 5, 2000

[54] GAS STORAGE USING FULLERENE BASED ADSORBENTS

[75] Inventors: Raouf O. Loutfy, Tucson, Ariz.; Xiao-Chun Lu, Newark, Del.; Weijiong Li; Michael G. Mikhael, both of Tucson, Ariz.

[73] Assignee: Materials and Electrochemical Research (MER) Corporation, Tucson, Ariz.

[21] Appl. No.: 09/153,905

[22] Filed: Sep. 16, 1998

[51] Int. Cl.[7] .................................................. B01D 53/04
[52] U.S. Cl. ........................... 95/116; 95/117; 95/127; 95/128; 95/130; 95/138; 95/139; 95/903; 96/108; 96/144; 96/146; 96/153; 502/416; 502/428
[58] Field of Search ............................ 95/116, 117, 121, 95/126–128, 130, 138, 139, 900, 903; 96/108, 143, 144, 146, 153; 502/416, 428, 437

[56] References Cited

U.S. PATENT DOCUMENTS

| | | | |
|---|---|---|---|
| 4,810,266 | 3/1989 | Zinnen et al. | 95/139 |
| 5,292,706 | 3/1994 | Chang et al. | 502/416 X |
| 5,292,707 | 3/1994 | Aparicio et al. | 502/416 X |
| 5,308,481 | 5/1994 | Stalling et al. | 210/198.2 |
| 5,395,589 | 3/1995 | Nacson | 95/47 X |
| 5,447,557 | 9/1995 | Golden et al. | 95/138 X |
| 5,453,413 | 9/1995 | Eklund | 502/416 |
| 5,518,528 | 5/1996 | Tom et al. | 95/103 |
| 5,529,607 | 6/1996 | Tan | 95/130 X |
| 5,626,650 | 5/1997 | Rodriquez | 95/900 X |
| 5,704,965 | 1/1998 | Tom et al. | 96/143 X |
| 5,704,967 | 1/1998 | Tom et al. | 96/143 |
| 5,707,424 | 1/1998 | Tom et al. | 95/127 X |
| 5,761,910 | 6/1998 | Tom | 96/108 X |
| 5,916,245 | 6/1999 | Tom | 96/108 X |
| 5,935,305 | 8/1999 | Tom et al. | 96/108 X |

OTHER PUBLICATIONS

Roger Taylor et al., "The Chemistry of Fullerenes", Nature vol. 363, pp. 685–692, Jun 24, 1993.

Takeshi Arai et al., "Resistivity of Single Crystal $C_{60}$ and Effect of Oxygen", Solid State Communications, vol. 84, No. 8, pp. 827–829, 1992.

Corinne C. Eloi et al., "An investigation of photo assisted diffusion of oxygen in solid $C_{60}$ filars using resonant alpha–scattering", J. Mater. Res. vol. 8, No. 12, pp. 3085–3089, Dec. 1993.

Roger A. Assink et al., "Intercalation of molecular species into the interstitial sites of Fullerene", J. Mater. Res., vol. 7, No. 8, pp. 2136–2143, Aug. 1992.

*Primary Examiner*—Robert H. Spitzer
*Attorney, Agent, or Firm*—Jerome M. Teplitz

[57] ABSTRACT

This invention is directed to the synthesis of high bulk density high gas absorption capacity adsorbents for gas storage applications. Specifically, this invention is concerned with novel gas absorbents with high gravimetric and volumetric gas adsorption capacities which are made from fullerene-based materials. By pressing fullerene powder into pellet form using a conventional press, then polymerizing it by subjecting the fullerene to high temperature and high inert gas pressure, the resulting fullerene-based materials have high bulk densities and high gas adsorption capacities. By pre-chemical modification or post-polymerization activation processes, the gas adsorption capacities of the fullerene-based adsorbents can be further enhanced. These materials are suitable for low pressure gas storage applications, such as oxygen storage for home oxygen therapy uses or on-board vehicle natural gas storage. They are also suitable for storing gases and vapors such as hydrogen, nitrogen, carbon dioxide, and water vapor.

180 Claims, 4 Drawing Sheets

○ $C_{60}$ MOLECULE

◉ TETRAHEDRAL SITE

⊞ OCTAHEDRAL SITE

GAS STORAGE USING FULLERENE BASED ADSORBENTS

This invention was made with government support under contract No. NAS2-14194 and No. NAS2-14381 awarded by the National Aeronautics and Space Administration (NASA). The government has certain rights in this invention.

This invention relates to the making and using of fullerene-based gas adsorbents for storing gases such as oxygen; and more particularly to the making and using of such gas adsorbents which are made by pelletizing fullerenes and by polymerizing fullerenes.

BACKGROUND OF THE INVENTION

During the past twenty years, research work has been performed on alternative gas storage technologies based on gas-solid adsorption. There are many potential applications of this technology, such as on-board vehicle natural gas storage, on-board vehicle hydrogen gas storage, and oxygen storage for medical and aerospace applications. The advantage of this technology is the low or medium gas pressure requirement, therefore, reducing the high pressure compression cost, avoiding high pressure hazards, and making gas storage easier to handle. However, the successful application of the adsorption based gas storage technology has been halted by the lack of high performance adsorbent materials.

The materials which are suitable for gas storage applications must possess large amounts of pore surfaces, primarily micropore (pore diameter of less than 2 mm) and mesopore (pore diameter of 2 to 50 mm) surfaces. When contacted to gases, a large amount of gas molecules can be adsorbed on these pore surfaces. More gas molecules will be adsorbed with higher gas pressure, while gas molecules will leave the pore surface (desorption) when gas pressure is reduced. Therefore, in most cases, gas adsorption and desorption are reversible processes, making them suitable for gas storage applications.

When evaluating the gas storage performance of an adsorbent, two criteria are used; namely, the equilibrium adsorption capacities and the dynamic adsorption/desorption properties. The equilibrium adsorption capacities are quantified by the gravimetric adsorption (weight of gas adsorbed/unit weight of adsorbent) and the volumetric adsorption capacity (weight of gas adsorbed/unit volume of adsorbent). The dynamic adsorption/desorption properties include the adsorption/desorption rate, the adsorption/desorption recycleability, and adsorption/desorption hysteresis.

The most researched gas adsorbents for gas storage applications are high surface area activated carbons and zeolites. Activated carbons are made from carbonaceous materials such as coal pitch, coconut shells, and petroleum wastes. Activated carbons possess large amounts of micropores and mesopores as well as macropores (with pore diameter larger than 50 mm). The surface areas of activated carbon range from hundred to few thousand square meters per gram. The gravimetric gas adsorption capacities of activated carbon are the highest among different adsorbents, and they usually have excellent dynamic adsorption/desorption properties. However, the bulk densities of activated carbons are usually very low, ranging from 0.1 to 0.7 gram/cc, and the higher surface area of the activated carbon usually results in lower bulk density. The low bulk density nature of activated carbons means the adsorbents have relatively low volumetric gas storage capacities.

Zeolites are porous crystalline aluminosilicates. The zeolite framework consists of an assemblage of $SiO_4$ and $AlO_4$ tetrahedral molecular structures joined together in various regular arrangements through shared oxygen atoms, to form an open crystal lattice containing pores of molecular dimensions into which gas molecules can be adsorbed. By pressing into pellets or particles with the help of binding materials, zeolites have relatively high bulk density, ranging from 0.5 to 1.5 gram/cc. However, the gravimetric adsorption capacities of the zeolites are relatively low, and the dynamic adsorption/desorption capacities of the zeolites are not as good as those of activated carbon. A lot of zeolites exhibit large desorption hysteresis which makes adsorption/desorption not completely reversible.

OBJECTS AND ADVANTAGES OF PRESENT INVENTION

It is an object of the present invention to provide an improved method and apparatus for storing a gas, such as oxygen, hydrogen, carbon dioxide or natural gas, in a novel adsorbent that enables such storage under relatively low pressure, thereby avoiding the need for expensive high pressure gas compression and storage and also avoiding the attendant hazards of such high pressure storage.

It is a further object of the present invention to provide novel gas adsorbent materials having relatively high gravimetric and volumetric gas adsorption capacities.

It is a further object of the present invention to provide novel methods for making gas adsorbent to achieve the foregoing objects and advantages.

It is a still further object of the present invention to provide novel gas storage adsorbents having relatively low desorption hysteresis characteristics, whereby the adsorption/desorption process is reversible to a greater degree than many zeolites, thus providing excellent gas adsorption/desorption recycleability.

It is a further object of the present invention to provide novel gas storage adsorbents suitable for storing gases at relatively low temperatures and pressures.

SUMMARY OF THE INVENTION

One aspect of the present invention involves a method of storing a gas or vapor, such as oxygen, hydrogen, carbon dioxide, nitrogen, water vapor or natural gas in a closed chamber containing an adsorbent for the gas. The adsorbent comprises a fullerene-based material in pelletized form, preferably having a bulk density of at least 1.4 grams per cubic centimeter, and advantageously pelletized from fullerene powder without the presence of a binder.

In accordance with another aspect of the invention, the fullerene-based adsorbent comprises polymerized fullerene material, preferably in the form of pelletized fullerene prior to polymerization.

In a preferred embodiment the fullerene based material is made of fullerene that is polymerized by subjecting it to high temperature heat under high inert gas pressure, whereby the polymerization process causes the molecular cage structure of the fullerene material to be broken/open.

In accordance with a still further aspect of the invention, the fullerene based material is formed of polymerized fullerene material that is reacted with organic molecules prior to polymerization, whereby the organic molecules are attached to the fullerene molecules prior to polymerization.

Preferably, the chemically modified fullerenes are pelletized to increase their bulk density prior to polymerization.

In a preferred embodiment the organic molecules comprise 1,4-phenylenediamine (PDA), whereby two-dimensional fullerene-PDA polymer structures are formed with the fullerene molecules prior to polymerization.

In another preferred embodiment, the organic molecules comprise hexamethylenediamine (HMDA), whereby two-dimensional fullerene-HMDA polymer structures are formed with the fullerene molecules prior to polymerization.

In still another embodiment, the fullerene material, preferably in pelletized form, is subjected to oxidation by exposing it to pure oxygen gas at elevated temperature prior to polymerization thereby increasing its gas adsorption capacity.

In a still further aspect of the invention, the fullerene-based material is chemically modified after polymerization by subjecting it to an activation process to enhance its gas adsorption capacity by generating additional micropores.

In preferred embodiments, the post polymerization activation process is carried out by passing a gas over the polymerized fullerene-based material at an elevated temperature; preferably, the gas is selected from among carbon dioxide, ammonia, air and water, and the elevated temperature is preferably in the range of 350° C. to 850° C., depending on the gas used.

In a further embodiment, the fullerene material, in pelletized form, is subjected to oxidation at elevated temperature and pressure, followed by activation by exposure to carbon dioxide at an elevated temperature above 90° C. and under pressure below that which will result in polymerization of the oxidized fullerene material.

The preferred form of fullerenes in carrying out the embodiments described above comprise $C_{60}$ and preferably a mixture of about 50% $C_{60}$ and 50% higher molecular weight fullerenes. The preferred fullerene mixture is 50% higher molecular weight fullerenes that are principally $C_{70}$.

DETAILED DESCRIPTION OF THE INVENTION

In this invention, a high density, high performance gas adsorbent is developed for gas storage applications using fullerene-based materials. These materials have higher gravimetric gas adsorption capacities than the best available activated carbons, have bulk densities as high as 1.4 gram/cc, and have excellent dynamic gas adsorption/desorption properties. Gravimetric gas adsorption capacities of the developed adsorbents were compared with those measured on a 3,000 $m^2$/gram surface area activated carbon (M-30, Osaka Gas, Japan).

Figure 1:
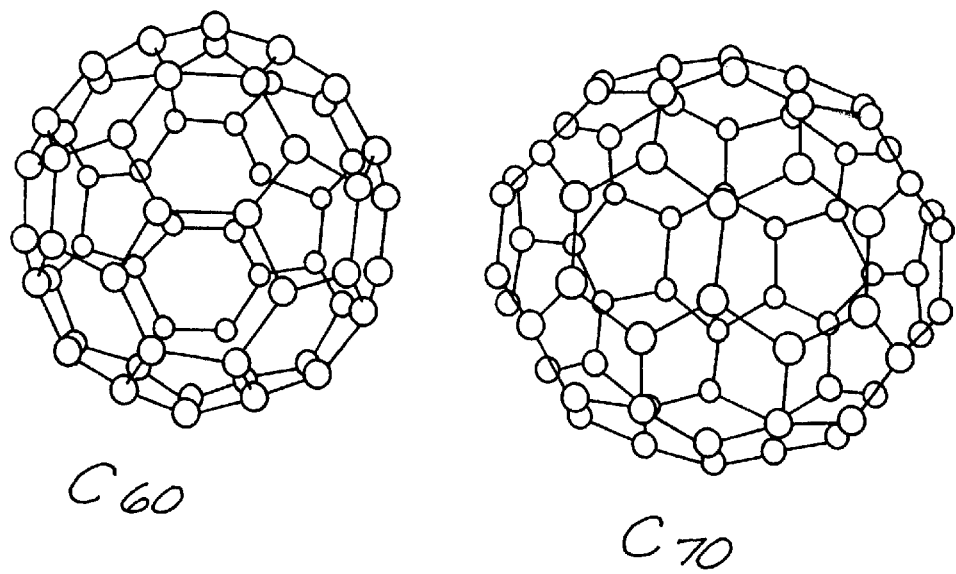
FIG. 1 is a schematic illustration of the structures of $C_{60}$ and $C_{70}$ molecules. $C_{60}$ molecule is spherical shaped while $C_{70}$ is more like football shape.

Fullerenes are a family of closed-cage carbon molecules with a wide range of shapes, sizes and molecular weights. The different sizes span the range of $C_{20}$ to $C_{500}$ including the most stable molecules of $C_{60}$ and $C_{70}$ (see FIG. 1). Fullerenes are produced in a reactor by vaporizing and condensing graphite in a helium atmosphere, for example, as disclosed by W. Kratschmer et al. In "Solid $C_{60}$, A new Form of Carbon" NATURE, Vol. 347, No. 6291, pp. 354–358, Sep. 27, 1990. It is believed that the condensation starts by a few carbon atoms joining in two-dimensional sheets. These sheets have dangling carbon molecular atoms at thin edges where carbon atoms attach themselves in hexagonal and pentagonal patterns. The two different patterns cause the sheet to curve, and the more molecules that are added, the more pronounced the curvature becomes. This continues until finally the top closes off and forms the closed-cage carbon molecule. The fullerenes used for this invention may be fullerene mixtures with about 80% $C_{60}$, 19% $C_{70}$, and 1% higher fullerenes, which are produced from an arc reactor, such as disclosed by W. Kratschmer et al. In a preferred embodiment of this invention, however, it has been discovered that a mixture of about 50% $C_{60}$ and 50% $C_{70}$ is better.

There are two unique properties associated with fullerenes which can be utilized for gas storage applications. The first property (I) is, the pelletizability of fullerenes. Fullerenes can be pelletized without a binder, and as high as 1.5 gram/cc bulk density can be achieved. The term "pelletized" is used herein to mean compressed and is not intended to limit the size or shape of the pellets. This property (I) provides two advantages for gas storage applications. First, the advantage (A) is that the high bulk density of pelletized fullerenes results in high volumetric gas storage density. Second, the advantage (B) is that the pelletized fullerenes provide proper physical strength, gas transfer rate, and particle dimension suitable for gas charge-discharge processes.

The second property (II), useful for gas storage applications, is the capability of physically adsorbing gas molecules in large interstitial spaces inherent in the FCC crystal structure. When crystallized, fullerenes form face-centered-cubic (FCC) crystalline structure. Since the effective molecular diameter of $C_{60}$ is about 1 nm, the interstices are large enough to accommodate most gas molecules (see FIG. 2). For example, the octahedral sites of $C_{60}$ crystal have a volume larger than 0.42×0.42×0.42 nm, while the kinetic diameter of most gas molecules is less than 0.35 nm. Therefore, those interstices can physically attract gas molecules by van der Waals forces. The interstices act like micropores of conventional adsorbents such as activated carbon. Furthermore, the gas adsorption capacity of fullerenes can be significantly increased by subjecting them to a polymerization process. Fullerenes can be polymerized under high temperature in an inert gas environment such as argon. When fullerenes are polymerized, the closed-cage structure is opened, and the inside closed-cage spaces are also available for gas molecules, hence increasing the gas storage capacities. Compared with activated carbons, in which gas molecules are adsorbed in pores between several twisted graphite sheets, polymerized fullerenes provide pores for gas molecules between every curved graphite sheet. This unique structure of polymerized fullerenes results in extraordinary high gas storage capacities.

When the fullerenes are thus polymerized they are denatured, as evidenced by the fact that the fullerenes are no longer soluble in toluene.

Although the preferred method of polymerization is by subjecting the fullerene to heat in an inert gas environment, as described above, it is also possible to achieve polymerization by irradiating the fullerene with ultraviolet radiation. However, polymerization by heat is preferred.

The term "fullerene based material" is used herein to mean a material comprising essentially pelletized fullerene powder that retains its fullerene nature as well as a denatured fullerene that is polymerized and a fullerene material that has been subjected to chemical modification, as described herein.

This invention also involves chemical modifications, either or both before and after the fullerene-polymerization process, to enhance the gas storage performance of the fullerene-based adsorbents. The polymerized fullerenes described above possess large amounts of micropores. However, due to the molecular size of fullerenes, these micropores have the dimension of less than 1 nm. Therefore, only one or two layers of gas molecules can be adsorbed on the pore surface which limits their gas storage capacities, especially at high gas pressures.

Figure 3:
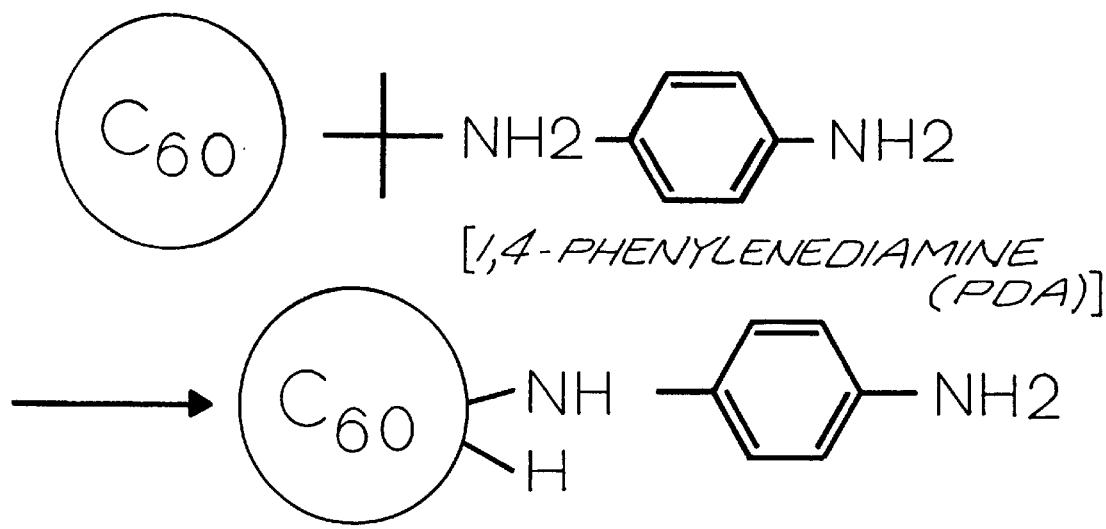
FIG. 3 illustrates the radical addition chemical reaction between $C_{60}$ and 1,4-phenylenediamine (PDA). One C=C double bond is opened-up and attached with hydrogen atom and rest component of 1,4-phenylenediamine.
Figure 4:
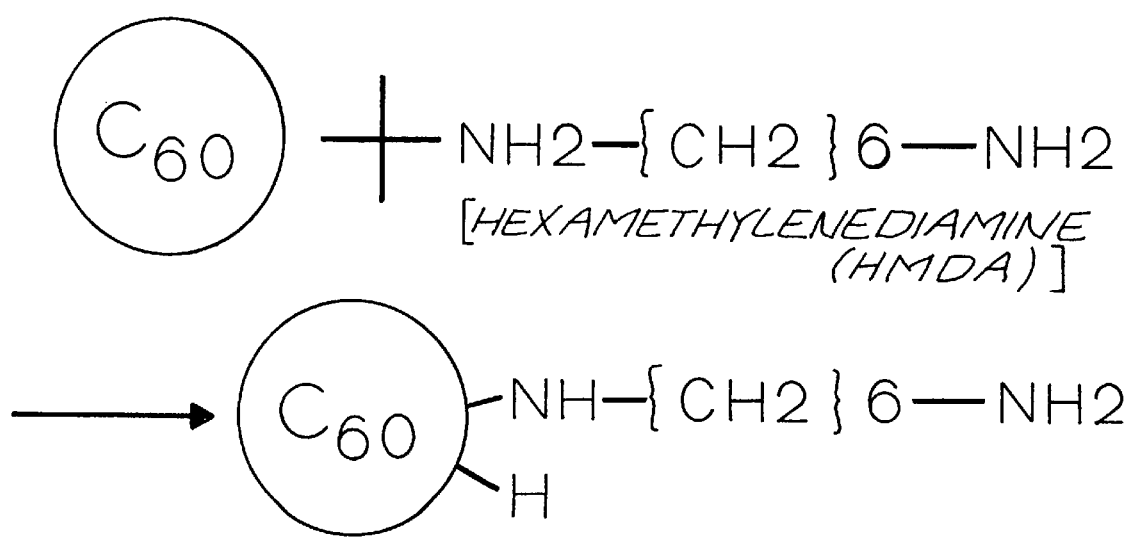
FIG. 4 illustrates the radical addition chemical reaction between $C_{60}$ and hexamethylenediamine (HMDA). One C=C double bond is opened-up and attached with hydrogen atom and the rest component of hexamethylenediamine.
Figure 5:
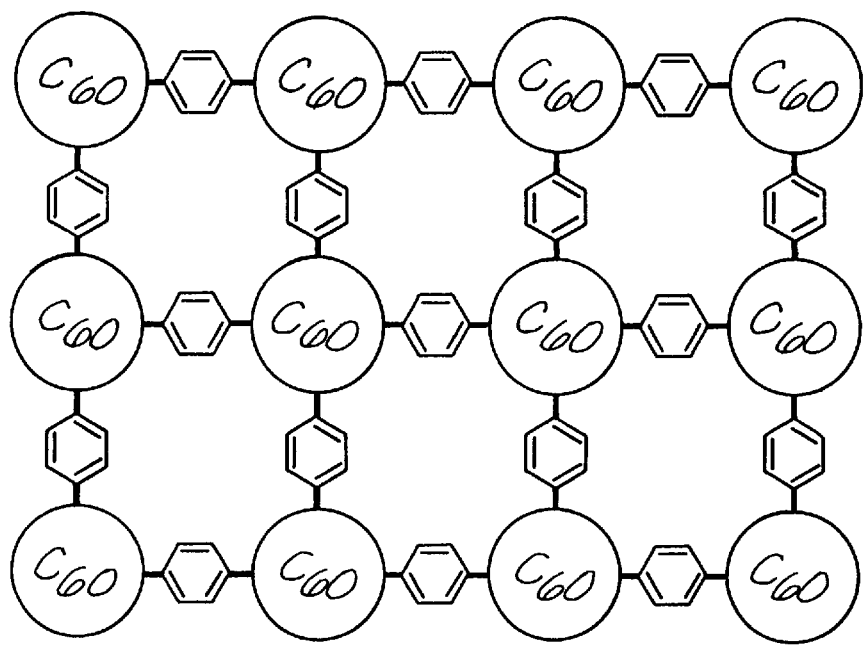
FIG. 5 illustrates the two-dimensional structure of reacted $C_{60}$ and 1,4-phenylenediamine product. The $C_{60}$ molecules are separated by 1,4-phenylenediamine molecules and form a two-dimensional polymerized structure.

The chemical modification before polymerization process involves a chemical reaction of fullerenes with certain large size organic molecules. After the chemical reaction, the organic molecules or radicals are attached to the fullerene molecules and these organic molecules act as spacers to increase the inter-fullerene molecular spaces. For example, fullerenes can be reacted with 1,4-phenylenediamine (PDA) to form a two-dimensional fullerene-PDA polymer structure. The radical addition reaction of fullerene molecule and PDA is illustrated in FIG. 3. In this reaction, a C=C double bond is opened-up and bonded with a —H and —NH group from PDA. By controlling the molar ratio of fullerene to PDA, a two-dimensional polymerized structure of fullerene-PDA compound, which is illustrated in FIG. 5, can be formed. This fullerene-PDA compound is still pelletizable without binder, and the density of the pelletized compound is 1.3 gram/cc which is smaller than 1.5 gram/cc for pelletized un-modified fullerenes. After heat treatment process (polymerization process), relatively large micropore structure will be formed. Compared with adsorbents prepared using un-modified fullerene, the so prepared adsorbents have higher gravimetric gas adsorption capacities, and faster gas adsorption/desorption rates. Other large organic molecules can also be reacted with fullerene to form a similar compound as that illustrated in FIG. 5, such as hexamethylenediamine (HMDA) (see FIG. 4) and the giant o-xylene molecules.

The chemical modification process can be carried out on the fullerene material prior to pelletization.

The chemical modification after fullerene polymerization process involves activation processes using certain gases. Same as other carbonaceous materials, the activation process will generate extra micropores, hence increasing the gas adsorption capacities. The activation process can be performed in a tube furnace with gases such as carbon dioxide, ammonia, air, or water vapor at temperature of 350–850° C. depending on the gas used. In this process one or more of these gases is passed over the polymerized fullerene, preferably in pelletized form, in the tube furnace.

The chemical modification can be advantageously carried out to enhance the gas storage capacity of fullerene material without polymerization. This may involve reaction of the fullerene material with oxygen as described in Example 12, below, or reaction with PDA or HMDA, as described above. The chemical modification is advantageously carried out prior to pelletization of the fullerene material. In a preferred embodiment of the chemical modification process the fullerene material is dissolved in toluene and an amine is added to the solution to carry out the chemical modification prior to removing the solvent and pelletizing the chemically treated fullerene material.

1. Quantitative Data

Figure 6:
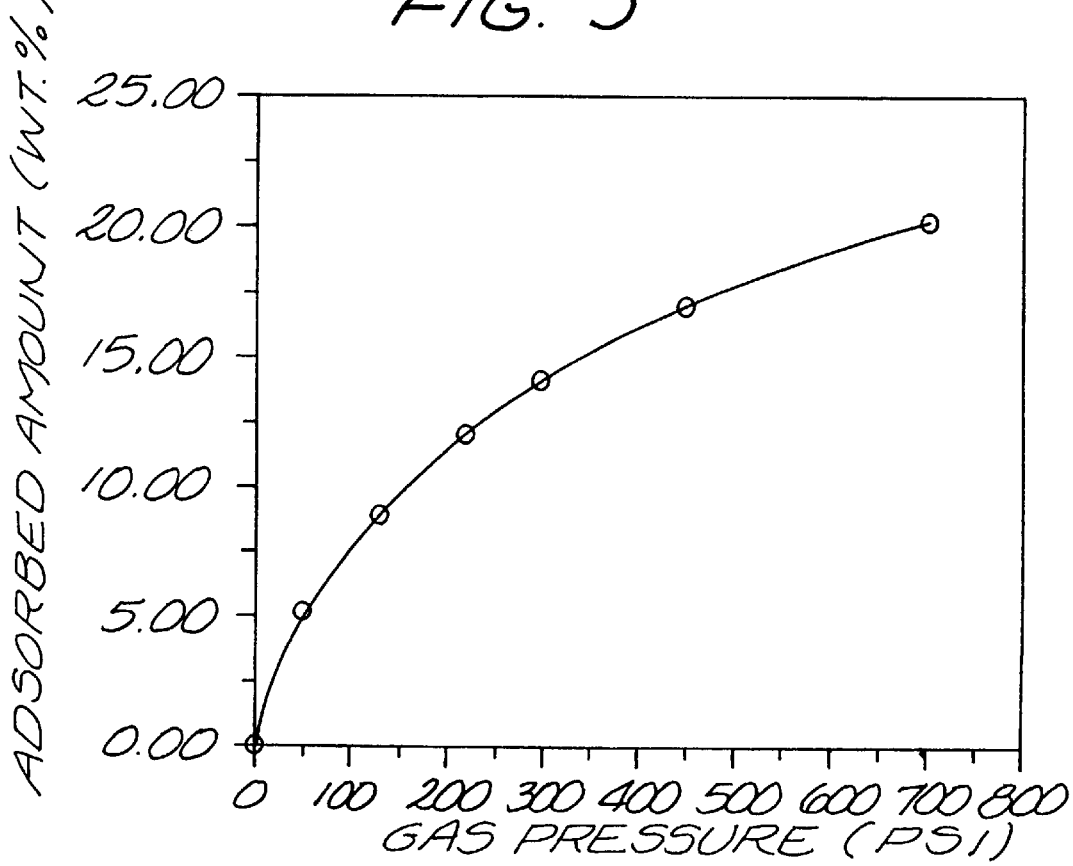
FIG. 6 is a graph illustrating the oxygen adsorption isotherm on polymerized fullerenes at 20° C.

The adsorption isotherm measurement (a typical oxygen adsorption isotherm measured at 20° C. is shown in FIG. 6) showed that the oxygen gas storage densities of polymerized fullerenes are significantly larger than those of carbon molecular sieves. Furthermore, polymerized fullerenes can be prepared as dense pellets with packing density as high as 1.5 g/cc, while conventional activated carbons have relatively low packing densities about 0.3 to 0.7 g/cc. The higher packing density means higher volumetric gas storage capacities (the amount of gas stored per unit storage volume). The significance of oxygen storage on polymerized fullerenes is more pronounced in the low pressure range, e.g., from 50 to 150 psi. Listed in Table 1 is the comparison of oxygen storage capacities on polymerized fullerenes (PF) and on other adsorbents. It can be seen that PF is much more effective to store oxygen at low pressures than other adsorbents. For example, at 50 psi, the amount of oxygen that can be stored on PF pellets is equivalent to the amount of oxygen stored in compressed gas cylinders at 844 psi based on the same storage volume and temperature. That is, the pressure ratio of compressed oxygen system to oxygen-PF system is about 17, while this ratio for carbon molecular sieve to oxygen-PF system is less than 3.

Based on the data listed in Table 1, it can be calculated that to store 1 liter of oxygen (at standard state, i.e., at 0° C and 1 atm), at 100 psi pressure using PF, about 18 gram material and about 12 cc volume are required. At 100 psi pressure, the same amount of oxygen would require 68 gram material or 57 cc volume if zeolite 5A is used.

TABLE 1

Comparison of Oxygen Gas Storage on Various Adsorbents

|  | Packing density (g/cc) | 50 psi | | 100 psi | |
| --- | --- | --- | --- | --- | --- |
|  |  | Capacity (% by weight)[a] | Corresponding pressure in gas cylinder[b] | Capacity (% by weight)[a] | Corresponding pressure in gas cylinder[b] |
| Pb | 1.5 | 5.2 | 844 (16.8)[c] | 7.9 | 1307 (13.1)[c] |
| Carbon MS | 0.7 | 1.8 | 139 (2.8)[c] | 2.7 | 208 (2.1)[c] |
| 5 A/zeolite | 1.2 | 1.2 | 158 (3.2)[c] | 2.1 | 278 (2.8)[c] |

[a]Gram oxygen gas adsorbed on each gram sample multiply by 100
[b]With the same storage volume and temperature, the storage pressure of the compressed cylinder required to store the amount of oxygen which could be stored in the adsorbent at that pressure (50 psi or 100 psi)
[c]Pressure ratio of compressed gas cylinder storage and oxygen-adsorbent storage 2. Design of Oxygen Storage Unit The key factors for design of an oxygen storage unit using polymerized fullerenes are: (i) the kinetic oxygen charge-discharge management, and (ii) the oxygen charge-discharge thermal management. A storage unit design which is suitable to address both factors is schematically illustrated in FIG. 7.

Figure 7:
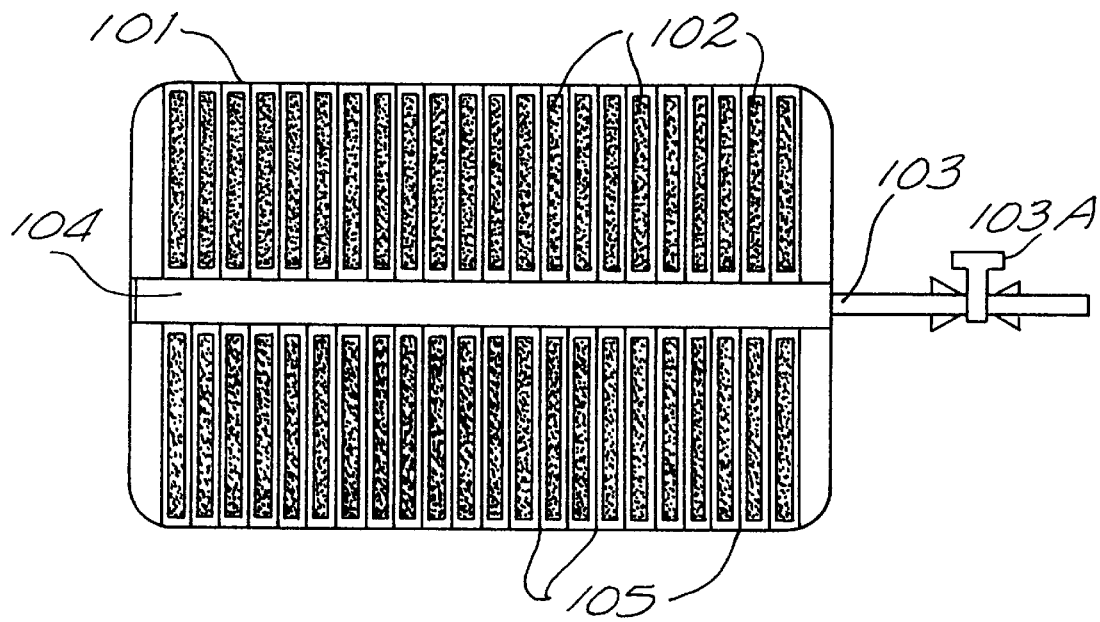
FIG. 7 is a schematic illustration of a storage chamber suitable for containing a fullerene-based gas adsorbent for storing a gas in accordance with the invention.

In the design shown in FIG. 7, a light weight metal tank 101, made of metal, such as stainless steel, suitable for maintaining the stored gas at the required pressure is filled with polymerized fullerene pellets 102. A tube 103, shown penetrating the tank wall and connecting to a porous tube 104, is used for both inlet and outlet of oxygen gas. A control valve 103A for controlling the flow in tube 103 provides means for selective input or output of the stored gas. In order to facilitate fast distribution of the oxygen in the fullerene matrix, the tube 104 is connected to a duct system, shown as a series of wire mesh disks or metal grills 105 that radiate from the inlet outlet tube 103 to the inner tank walls. The wire meshes 105 provide flow channels for oxygen to reach all areas of the fullerene matrix more rapidly and uniformly rather than depending on the oxygen traversing the fullerene matrix from one end of the tank to the other end. Since the wire mesh or metal grill system 105 is made up by highly thermal conductive material, such as aluminum, the heat generated during oxygen charge process can quickly be dissipated through the wire mesh system. The ambient heat can be quickly transferred to fullerene-based adsorbent materials during oxygen discharge process.

3. Other Potential Applications

Figure 8:
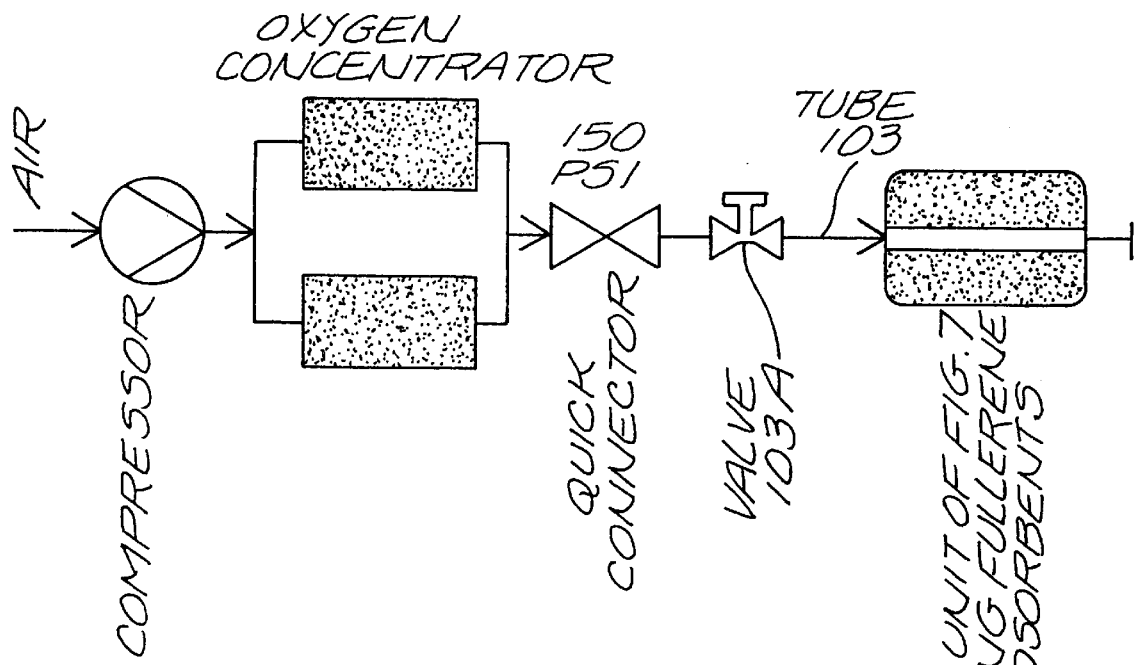
FIG. 8 is a schematic illustration of a coupled oxygen generation and storage system, wherein the storage unit contains a fullerene-based adsorbent in accordance with the invention.

The fullerene based high density adsorbent material in accordance with this invention can be used for many applications. Besides a stand-alone oxygen storage unit, such a storage unit can be coupled with a medium pressured home oxygen concentrator to form a home rechargeable oxygen generation and storage system, as schematically illustrated in FIG. 8. Since the storage unit of FIG. 7 is suitable for low pressure storage of oxygen, for example, at pressure in the order of 30 psi, it is suitable for use with a low pressure oxygen generator as shown in FIG. 8. Using this coupled oxygen generation and storage system, the portable oxygen storage unit can be recharged at home, therefore, the major limitations associated with the cryogenic liquid oxygen storage and high pressure cylinder oxygen storage systems can be avoided.

The other potential applications of the invention include the on-board natural gas storage tank for natural gas powered vehicles, on-board hydrogen gas storage tank for fuel cell powered vehicles and air storage unit for fire fighters and for other life support systems. They are also suitable for low pressure, high density storage applications for gases and vapors such as carbon monoxide, carbon dioxide, argon, nitrogen, and water vapor in some particular situations.

The invention is also suitable for use in storing gases at low temperatures, for example, oxygen can be stored at dry ice temperature at relatively low pressure of 150 psi and hydrogen can be stored at liquid nitrogen temperature and relatively low pressure of 100 psi.

In brief summary, this invention provides high bulk density, high gas adsorption capacity adsorbents comprised of fullerene based materials. This invention involves several different approaches, including the following. A first approach is to press fullerene materials into dense pellet or particles, thereby providing high bulk density. A second approach is to polymerize the fullerene pellets at high temperature under high inert gas pressure. A third approach is to use pre-chemical treatment process to modify the pore structure of the polymerized fullerene-based adsorbent, thereby, to further enhance the gas adsorption capacities. A fourth approach is to use post chemical activation treatment to modify the pore structure of the polymerized fullerene adsorbent, preferably after it has been pelletized. A fifth approach is a combination of the third and fourth, in both pre-chemical and post chemical treatment of the polymerized fullerene adsorbent. A sixth approach is to combine pre-chemical treatment, such as oxidation, followed by post-chemical activation, for example, by exposing it to $CO_2$ gas at elevated temperature, without the use of polymerization. The following Examples will demonstrate the invention.

EXAMPLES

Example 1

In this Example, $C_{60}/C_{70}$ mixture powders produced from fullerene arc reactor in the method of Kratschmer et al. was used to prepare dense pellets. As produced $C_{60}/C_{70}$ mixture powder has crystalline particles sizes in the range of micrometers. The powder was pressed into dense pellet without any binder using a conventional press. In this Example, by loading $C_{60}/C_{70}$ mixture powder into a 1 cm diameter die, and applying 2,000 lb force using a press, the powder formed a cylindrical pellet. The pellet was determined to have a bulk density of 1.5 gram/cc. The theoretical density of fullerene crystals is 1.75 gram/cc. Therefore, the so prepared fullerene based adsorbent material consisted of a fullerene pellet that still had a large amount of interparticle spaces which serve as mesopores during gas adsorption/desorption process. The fullerene pellet was used to store oxygen, nitrogen, carbon dioxide, air, hydrogen, and water vapor gases under low pressure in the range of atmospheric pressure to 1200 psi.

Example 2

The fullerene based material comprising the fullerene pellet prepared, as described in Example 1, was found to posses a large amount of interparticle spaces and interfullerene-molecule spaces which serve as mesopores and micropores during gas adsorption, therefore, they are capable to adsorb large amount of gas molecules. In carrying out this Example, the gas adsorption capacities of fullerene pellet were further enhanced by subjecting it to a polymerization process. In this Example, the fullerene pellets were heat treated at 1200° C. under 5,000 psi in an argon gas atmosphere for 26 minutes. The fullerene was thereby polymerized, that is, some of the C=C double bonds were opened-up and randomly joined, the closed-cage structure of fullerene molecules was destroyed and the inside close-caged spaces were also available for gas molecules to be stored therein. Compared with un-polymerized fullerene pellets as prepared in Example 1, the polymerized fullerenes were determined to have higher gas adsorption capacities, faster gas adsorption/desorption rates but smaller bulk densities. The bulk density of polymerized fullerenes is 1.4 gram/cc. The polymerized fullerene pellets comprising the fullerene based adsorbent material of this Example 2 were used to store oxygen, hydrogen, carbon dioxide, and nitrogen.

Example 3

Figure 2:
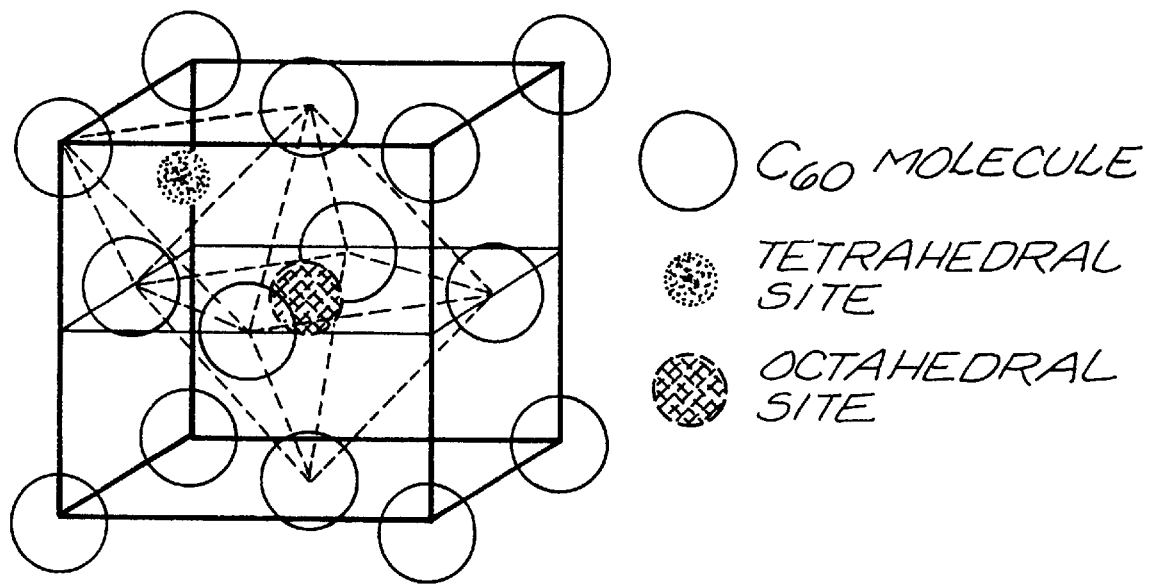
FIG. 2 is a schematic illustration of Face-Centered-Cubic (FCC) crystalline structure of fullerenes. There are 2 octahedral sites and 4 tetrahedral sites in each unit crystalline cell.

In this Example, fullerene powders produced in an arc reactor as described in Example 1 were subjected to a pre-chemical modification process by reacting the fullerenes with PDA (1,4-phenylenediamine). The chemical reaction of fullerene molecule with PDA is illustrated in FIG. 3. In this reaction, a C=C double bond of fullerene molecule is opened-up and bonded with —H and —NH groups from PDA. By controlling the molar ratio of fullerene to PDA, a two-dimensional polymerized structure of fullerene-PDA compound, as illustrated in FIG. 5, was formed. This fullerene-PDA compound was pelletized without binder as described in Example 1 and the density of the pelletized compound was determined to be 1.3 gram/cc, which is smaller than 1.5 gram/cc for pelletized unmodified fullerenes. Compared with fullerene crystalline structure, which is illustrated in FIG. 2, fullerene-PDA compound has large intermolecular spaces. Therefore, when polymerized by heat treatment, relatively larger micropores will be generated, thereby increasing the gas adsorption capacities. After pre-chemical modifications with PDA, the fullerene-PDA compound pellets were subjected to the same polymerization process as described in Example 2. After the polymerization process, the so prepared fullerene based adsorbent was determined to have higher gas adsorption capacities for oxygen, nitrogen, and carbon dioxide than those prepared in Example 2. However, the bulk density is smaller, which is about 1.2 gram/cc.

Example 4

In this Example, pre-chemical modification of fullerene similar to that of Example 3, however, was performed using hexamethylenediamine (HMDA) rather than PDA, to react with the fullerene molecules. The chemical reaction of fullerene molecule and HMDA is illustrated in FIG. 4. Using procedures similar to those used in Example 3 to pelletize and polymerize the fullerene-HMDA compound, a gas storage adsorbent was prepared with the similar physical and gas adsorption properties for oxygen, nitrogen and carbon dioxide as the fullerene based adsorbent prepared in Example 3.

Example 5

In this Example, fullerene pellets prepared, as described in Example 1, were subjected to a pre-oxidation process. In this process, oxygen atoms instead of organic molecules or radical are bonded to fullerenes. The oxidation process was performed by exposing the fullerene pellets to pure oxygen gas or air at elevated temperatures of 100° C. to 120° C. and at 100 psi to 150 psi pressure. High temperature and longer oxidation time is required for oxidation of fullerene pellets in air than that for pure oxygen. After oxidation, two to ten oxygen atoms are bonded to each of the fullerene molecules. After pre-oxidation, the fullerene pellets were subjected to the same polymerization process as described in Example 2. After polymerization process, the so prepared fullerene based adsorbent for these gases was used to store the same gases as in Example 2 and found to have the same physical properties as those fullerene based materials prepared in Example 2, except that the gas adsorption capacities for those gases were enhanced by the pre-oxidation process of this Example.

Example 6

In this Example, the gas adsorption capacities of the gas storage of the fullerene based materials prepared in each of Examples 2 to 5 were further enhanced by activation processes. The activation process was performed in a tube furnace with gases including carbon dioxide, ammonia, air, and water vapor at a temperature of 350–850° C. After activation, some of the closed pores were opened-up, new micropores were generated, and the size of some of the micropores was increased. Therefore, this process further increased the gravimetric gas adsorption capacities of the respective fullerene based adsorbent. However, there are weight losses (burn-off) during activation process, hence there was a reduction of bulk density of the gas storage materials. Trade-off must be made between burn-off and the increase in adsorption capacities. It was determined that the optimal burn-off is 15% weight loss which results in 30% increase of gravimetric gas adsorption capacities for oxygen. The gravimetric adsorption capacities of the fullerene based adsorbent, prepared in this Example 6, for other gases such as hydrogen, carbon dioxide, and nitrogen, were also increased.

Example 7

In this Example, oxygen gas was stored on polymerized fullerene based sample prepared in Example 2 and the storage capacities were measured using a volumetric gas adsorption apparatus. At temperature of 20° C. and oxygen pressure of 100 psi, the oxygen storage capacity on the sample was determined to be 7.9% by weight. This capacity corresponds to the storage pressure of 1307 psi when an empty gas cylinder is used for oxygen storage with the same storage volume and temperature.

Example 8

In this Example, oxygen gas was stored on fullerene-based adsorbent sample prepared in Example 6 and the stored capacities were measured using a volumetric gas adsorption apparatus. At a temperature of 20° C. and oxygen pressure of 100 psi, the oxygen storage capacity on the sample was determined to be 10.1% by weight while the bulk density is 1.3. This capacity corresponds to the storage pressure of 1450 psi when an empty gas cylinder is used for oxygen storage with the same storage volume temperature.

Example 9

In this Example, hydrogen was stored on polymerized fullerene prepared in Example 2 and the storage capacities were measured using a volumetric gas adsorption apparatus. At a temperature of 20° C. and hydrogen pressure of 1,000 psi, the hydrogen storage on the sample was determined to be 0.61% by weight.

Example 10

In this Example, carbon dioxide ($CO_2$) was stored on polymerized fullerene prepared in Example 2 and the storage capacities were measured using a volumetric gas adsorption apparatus. At a temperature of 20° C. and carbon dioxide pressure of 100 psi, the carbon dioxide storage on the sample was determined to be 37% by weight.

Example 11

In this Example, optimal fullerene-based gas storage adsorbents were prepared using the procedures described in each of Examples 1, 2, 5 and 6 with the following preparation conditions: For pelletization, mixed fullerenes (50/50 $C_{60}/C_{70}$ ratio) were pressed into pellets with ⅝" diameter and 0.08" thickness with 35,000 psi pressure. The pellets were oxidized at 120° C. with 90 psi pure oxygen gas pressure for 21 hours. About 8 oxygen atoms were attached on each fullerene molecule after oxidation. After oxidation, the pellets were polymerized at 900° C. temperature in a non-oxidizing atmosphere with 14,000 psi argon gas pressure. After polymerization, the pellets were then activated in $CO_2$ gas at 850° C. for 4 hours. The so prepared adsorbents were determined to possess the highest gas storage capacities for gases including oxygen, hydrogen, and carbon dioxide among all the samples mentioned in the above Examples.

Example 12

In this Example, fullerene pellets were prepared as described in Example 1 and were subjected to the pre-oxidation process as described in Example 5, but were not polymerized. After pre-oxidation process, 12–15 oxygen was preferably attached on each fullerene molecule. The so prepared fullerene based pellets directly underwent an activation process using $CO_2$ gas without high temperature and high pressure polymerization processes, namely, at atmosphere pressure below that which would result in polymerization of the fullerene molecules. However, the temperature used for this direct activation process is higher, preferably at 95° C. The samples so prepared were determined to have similar gas storage capacities as those prepared in Example 11 for storing these gases mentioned in Example 11.

Example 13

In this Example, chemically modified fullerene-PDA compound as described in Example 3 was prepared using the following typical procedures: 0.5 grams of fullerene was placed in a 100 ml, three neck round bottom glass flask equipped with condenser, then a funnel, a stirrer bar and argon inlet were added to the flask. Dry 1,2-dichlorobenzene, purified by vacuum distillation over calcium hydroxide, was added as solvent. The reaction mixture was kept at 75° C. with stirring under argon for 1–2 h. The equivalent amount of PDA was dissolved in 5 ml warm 1,2-dichlorobenzene and then added to the reaction mixture. The mixture was kept stirring under argon at 75° C. for five days. At the end of the reaction time, the mixture was allowed to cool down and added with 300 ml methanol. The separated dark brown fine powder was filtered, washed thoroughly with hot methanol, and dried under vacuum. The resulting fullerene-PDA compound was determined to have gas adsorption characteristics like the adsorbent prepared in Example 3 for oxygen, nitrogen, and carbon dioxide.

Example 14

In this Example, chemically modified fullerene-HMDA compound as described in Example 4 was prepared using the same procedures as described in Example 13, except that equivalent amount of HMDA was used instead of PDA. This chemically modified fullerene-HMDA compound was used to store gases such as oxygen, nitrogen, and carbon dioxide.

Example 15

In this Example, oxygen was stored at low temperature on polymerized fullerene with pre-oxidation and post-activation processes, prepared in Example 11. The oxygen storage capacities were measured at −78° C. (temperature of dry ice and acetone mixture) using a volumetric gas adsorption apparatus. At oxygen gas pressure of 150 psi, the oxygen storage capacity was determined to be 43.7% by weight. The oxygen storage density (mass of oxygen stored per unit volume) at this temperature and pressure is about 479 $kg/m^3$, compared to 545 $kg/m^3$ for oxygen storage at 20° C. and 6000 psi and 410 $kg/m^3$ for oxygen storage at −119° C. and 737 psi (critical point of oxygen).

Example 16

In this Example, hydrogen was stored at low temperature on polymerized fullerene with pre-oxidation and post-activation processes, prepared in Example 11. The hydrogen storage capacities were measured at −196° C. (liquid nitrogen temperature) using a volumetric gas adsorption apparatus. At hydrogen gas pressure of 100 psi, the hydrogen storage capacity was determined to be 3.03% by weight. The hydrogen storage density (mass of oxygen stored per unit volume) at this temperature and pressure is about 33.3 $kg/m^3$.

Example 17

In this Example, nitrogen was stored by adsorption on fullerene based material comprising polymerized fullerene pellet prepared in Example 2 and the storage capacities were measured using a volumetric gas adsorption apparatus. At a temperature of 20° C. and nitrogen pressure of 250 psi, the nitrogen storage on the sample was determined to be 5.79% by weight.

Example 18

In this Example, water vapor was stored by being adsorbed on fullerene based material comprising polymerized fullerene with pre-oxidation and post-activation processes, prepared in Example 11. The water vapor adsorption capacity was measured at 25° C. with varying relative humidity. At relative humidity of 73.3%, the fullerene based adsorbent can adsorb 37.2% water vapor by weight. At relative humidity of 91.5%, the water vapor adsorption capacity is 54.2% by weight. Compared to commercial water vapor adsorbents such as silica gel and zeolite, the fullerene based adsorbent materials have higher adsorption capacities, particularly at high relative humidity.

What is claimed is:

1. The method of storing a gas that comprises maintaining the gas in a closed chamber containing a body of adsorbent material in contact with said gas under pressure above ambient, wherein said body of adsorbent material comprises fullerene based material selected from the group consisting of pelletized fullerene, polymerized fullerene, and pelletized polymerized fullerene.

2. The method of claim 1 wherein the fullerene based material is pelletized fullerene powder without the presence of a binder.

3. The method of claim 2 wherein the fullerene powder is pelletized to a bulk density of at least 1.4 grams per cubic centimeter.

4. The method of claim 3 wherein the pelletized fullerene powder is polymerized, whereby its molecular cage is broken/open.

5. The method of claim 4 wherein the fullerene based material is further characterized by the presence of organic molecules attached to the fullerene molecules prior to polymerization.

6. The method of claim 5 wherein the organic molecules comprise 1,4-phenylenediamine (PDA) attached to the fullerene molecules, thereby forming a two-dimensional fullerene-PDA polymer structure.

7. The method of claim 5 wherein the organic molecules comprise hexamethylenediamine (HMDA) attached to the fullerene molecules, thereby forming fullerene-HMDA polymers.

8. The method of claim 4 wherein the fullerene-based material is further characterized by chemical modification after polymerization by an activation process.

9. The method of claim 4 wherein the stored gas is oxygen.

10. The method of claim 4, wherein the fullerene material is further characterized by the presence of oxygen molecules attached to the fullerene molecules by oxidation prior to polymerization.

11. The method of claim 10 wherein the fullerene molecule is further characterized by chemical modification after polymerization by an activation process.

12. The method of claim 11 wherein the stored gas is water vapor.

13. The method of claim 4, wherein the stored gas is hydrogen.

14. The method of claim 4, wherein the stored gas is carbon dioxide.

15. The method of claim 4 wherein the stored gas is nitrogen.

16. The method of claim 3 wherein the stored gas is oxygen.

17. The method of claim 3, wherein the stored gas is hydrogen.

18. The method of claim 3, wherein the stored gas is carbon dioxide.

19. The method of claim 3 wherein the stored gas is nitrogen.

20. The method of claim 2 wherein the pelletized fullerene powder is polymerized, whereby its molecular cage structure is broken/open.

21. The method of claim 20 wherein the fullerene based material is comprised of a mixture of about 50% $C_{60}$ and the balance is of higher molecular weight fullerene material.

22. The method of claim 21 wherein the fullerene based material is further characterized by the presence of organic molecules attached to the fullerene molecules prior to polymerization.

23. The method of claim 22 wherein the organic molecules comprise 1,4-phenylenediamine (PDA) attached to the fullerene molecules, thereby forming a two-dimensional fullerene-PDA polymer structure.

24. The method of claim 22 wherein the organic molecules comprise hexamethylenediamine (HMDA) attached to the fullerene molecules, thereby forming fullerene-HMDA polymers.

25. The method of claim 21 wherein the fullerene-based material is further characterized by chemical modification after polymerization by an activation process.

26. The method of claim 21 wherein the stored gas is water vapor.

27. The method of claim 21 wherein the fullerene material is further characterized by the presence of oxygen molecules attached to the fullerene molecules by oxidation prior to polymerization.

28. The method of claim 27 wherein the fullerene molecule is further characterized by chemical modification after polymerization by an activation process.

29. The method of claim 28 wherein the stored gas is water vapor.

30. The method of claim 27 wherein the stored gas is water vapor.

31. The method of claim 20 wherein the fullerene based material is further characterized by the presence of organic molecules attached to the fullerene molecules prior to polymerization.

32. The method of claim 31 wherein the organic molecules comprise 1,4-phenylenediamine (PDA) attached to the fullerene molecules, thereby forming a two-dimensional fullerene-PDA polymer structure.

33. The method of claim 31 wherein the organic molecules comprise hexamethylenediamine (HMDA) attached to the fullerene molecules, thereby forming fullerene-HMDA polymers.

34. The method of claim 20 wherein the fullerene-based material is further characterized by chemical modification after polymerization by an activation process.

35. The method of claim 20 wherein the stored gas is oxygen.

36. The method of claim 20, wherein the fullerene material is further characterized by the presence of oxygen molecules attached to the fullerene molecules by oxidation prior to polymerization.

37. The method of claim 36 wherein the fullerene molecule is further characterized by chemical modification after polymerization by an activation process.

38. The method of claim 37 wherein the stored gas is water vapor.

39. The method of claim 20, wherein the stored gas is hydrogen.

40. The method of claim 20, wherein the stored gas is carbon dioxide.

41. The method of claim 20 wherein the stored gas is nitrogen.

42. The method of claim 2 wherein the fullerene based material is comprised of a mixture of about 50% $C_{60}$ and the balance is higher molecular weight fullerene material.

43. The method of claim 42 wherein the higher molecular weight fullerene material is principally $C_{70}$.

44. The method of claim 42 wherein the stored gas is water vapor.

45. The method of claim 2 wherein the stored gas is oxygen.

46. The method of claim 2, wherein the stored gas is hydrogen.

47. The method of claim 2, wherein the stored gas is carbon dioxide.

48. The method of claim 2 wherein the stored gas is nitrogen.

49. The method of claim 2 wherein the stored gas is water vapor.

50. The method of claim 1 wherein the fullerene based material is pelletized to a bulk density of at least 1.4 grams per cubic centimeter.

51. The method of claim 50 wherein the pelletized fullerene material is polymerized, whereby the molecular cage structure of the fullerene is broken/open.

52. The method of claim 51 wherein the fullerene based material is further characterized by the presence of organic molecules attached to the fullerene molecules prior to polymerization.

53. The method of claim 52 wherein the organic molecules comprise 1,4-phenylenediamine (PDA) attached to the fullerene molecules, thereby forming a two-dimensional fullerene-PDA polymer structure.

54. The method of claim 52 wherein the organic molecules comprise hexamethylenediamine (HMDA) attached to the fullerene molecules, thereby forming fullerene-HMDA polymers.

55. The method of claim 51 wherein the fullerene-based material is further characterized by chemical modification after polymerization by an activation process.

56. The method of claim 51 wherein the stored gas is oxygen.

57. The method of claim 51, wherein the fullerene material is further characterized by the presence of oxygen molecules attached to the fullerene molecules by oxidation prior to polymerization.

58. The method of claim 57 wherein the fullerene molecule is further characterized by chemical modification after polymerization by an activation process.

59. The method of claim 58 wherein the stored gas is water vapor.

60. The method of claim 51, wherein the stored gas is hydrogen.

61. The method of claim 51, wherein the stored gas is carbon dioxide.

62. The method of claim 50, wherein the fullerene material is subjected to a pre-chemical treatment under conditions that will not polymerize the fullerene material and wherein the chemically treated fullerene material is subjected to activation by exposing it to carbon dioxide gas at a temperature in excess of 900° C. while under pressure below that which will polymerize the chemically treated fullerene material.

63. The method of claim 62, wherein the pre-chemical treatment comprises oxidizing the fullerene material by exposing it to oxygen at elevated temperatures and pressure below that which will polymerize it.

64. The method of claim 62, wherein the pre-chemical treatment comprises reacting the fullerene material with 1,4-phenylenediamine (PDA), whereby a two-dimensional fullerene-PDA polymer structure is formed with the fullerene material.

65. The method of claim 62, wherein the pre-chemical treatment comprises reacting the fullerene material with hexamethylenediamine (HMDA), whereby a two-dimensional fullerene-HMDA polymer structure is formed with the fullerene material.

66. The method of claim 62, wherein the fullerene material is subjected to the pre-chemical treatment prior to pelletization of the fullerene material.

67. The method of claim 51 wherein the stored gas is nitrogen.

68. The method of claim 50 wherein the stored gas is oxygen.

69. The method of claim 50, wherein the stored gas is hydrogen.

70. The method of claim 50, wherein the stored gas is carbon dioxide.

71. The method of claim 50, wherein the fullerene material is subjected to a pre-chemical treatment under conditions that will not polymerize the fullerene material and wherein the chemically treated fullerene material is subjected to activation by exposing it to carbon dioxide gas.

72. The method of claim 71, wherein the pre-chemical treatment comprises oxidizing the fullerene material by exposing it to oxygen at elevated temperatures and pressure below that which will polymerize it.

73. The method of claim 71, wherein the pre-chemical treatment comprises reacting the fullerene material with 1,4-phenylenediamine (PDA), whereby a two-dimensional fullerene-PDA polymer structure is formed with the fullerene material.

74. The method of claim 71, wherein the pre-chemical treatment comprises reacting the fullerene material with hexamethylenediamine (HMDA), whereby a two-dimensional fullerene-HMDA polymer structure is formed with the fullerene material.

75. The method of claim 71, wherein the fullerene material is subjected to the pre-chemical treatment prior to pelletization of the fullerene material.

76. The method of claim 50 wherein the stored gas is nitrogen.

77. The method of claim 1 wherein the fullerene based material is polymerized, whereby the molecular cage structure of the fullerene is broken/open.

78. The method of claim 77 wherein the fullerene based material is comprised of a mixture of about 50% $C_{60}$ and the balance is of higher molecular weight fullerene material.

79. The method of claim 78 wherein the higher molecular weight fullerene material is principally $C_{70}$.

80. The method of claim 79 wherein the fullerene-based material is further characterized by chemical modification after polymerization by an activation process.

81. The method of claim 79, wherein the fullerene material is further characterized by the presence of oxygen molecules attached to the fullerene molecules by oxidation prior to polymerization.

82. The method of claim 81 wherein the fullerene molecule is further characterized by chemical modification after polymerization by an activation process.

83. The method of claim 82 wherein the stored gas is water vapor.

84. The method of claim 79 wherein the fullerene based material is further characterized by the presence of organic molecules attached to the fullerene molecules prior to polymerization.

85. The method of claim 84 wherein the organic molecules comprise 1,4-phenylenediamine (PDA) attached to the fullerene molecules, thereby forming a two-dimensional fullerene-PDA polymer structure.

86. The method of claim 84 wherein the organic molecules comprise hexamethylenediamine (HMDA) attached to the fullerene molecules, thereby forming fullerene-HMDA polymers.

87. The method of claim 78 wherein the stored gas is water vapor.

88. The method of claim 77 wherein the fullerene material is further characterized by the presence of organic molecules attached to the fullerene molecules prior to polymerization.

89. The method of claim 88 wherein the organic molecules comprise 1,4-phenylenediamine (PDA) attached to the fullerene molecules, thereby forming a two-dimensional fullerene-PDA polymer structure.

90. The method of claim 89 wherein the stored gas is oxygen.

91. The method of claim 89, wherein the stored gas is hydrogen.

92. The method of claim 88 wherein the organic molecules comprise hexamethylenediamine (HMDA) attached to the fullerene molecules, thereby forming fullerene-HMDA polymers.

93. The method of claim 92 wherein the stored gas is oxygen.

94. The method of claim 92, wherein the stored gas is hydrogen.

95. The method of claim 89, wherein the stored gas is carbon dioxide.

96. The method of claim 89 wherein the stored gas is nitrogen.

97. The method of claim 92, wherein the stored gas is carbon dioxide.

98. The method of claim 92 wherein the stored gas is nitrogen.

99. The method of claim 88 wherein the stored gas is oxygen.

100. The method of claim 88, wherein the stored gas is hydrogen.

101. The method of claim 88, wherein the stored gas is carbon dioxide.

102. The method of claim 88 wherein the stored gas is nitrogen.

103. The method of claim 77 wherein the fullerene-based material is further characterized by chemical modification after polymerization by an activation process.

104. The method of claim 103 wherein the stored gas is oxygen.

105. The method of claim 103, wherein the stored gas is hydrogen.

106. The method of claim 103, wherein the stored gas is carbon dioxide.

107. The method of claim 103 wherein the stored gas is nitrogen.

108. The method of claim 77 wherein the stored gas is oxygen.

109. The method of claim 77, wherein the fullerene material is further characterized by the presence of oxygen molecules attached to the fullerene molecules by oxidation prior to polymerization.

110. The method of storing a gas as defined in claim 109 wherein the oxidized polymerized fullerene based material has been subjected to chemical activation prior to storing the gas thereon.

111. The method of storing a gas as defined in claim 110 wherein the stored gas is oxygen.

112. The method of claim 111 wherein the oxygen is stored on the fullerene based adsorbent at dry ice temperature.

113. The method of storing a gas as defined in claim 110 wherein the stored gas is hydrogen.

114. The method of claim 113 wherein the hydrogen is stored on the fullerene based adsorbent at liquid nitrogen temperature.

115. The method of storing a gas as defined in claim 109 wherein the stored gas is oxygen.

116. The method of claim 115 wherein the oxygen is stored on the fullerene based adsorbent at dry ice temperature.

117. The method of storing a gas as defined in claim 109 wherein the stored gas is hydrogen.

118. The method of claim 117 wherein the hydrogen is stored on the fullerene based adsorbent at liquid nitrogen temperature.

119. The method of claim 109 wherein the fullerene molecule is further characterized by chemical modification after polymerization by an activation process.

120. The method of claim 119 wherein the stored gas is water vapor.

121. The method of claim 109 wherein the stored gas is water vapor.

122. The method of claim 77, wherein the stored gas is hydrogen.

123. The method of claim 77, wherein the stored gas is carbon dioxide.

124. The method of claim 77 wherein the stored gas is nitrogen.

125. The method of claim 77 wherein the stored gas is water vapor.

126. The method of claim 1 wherein the fullerene based material is comprised of a mixture of about 50% $C_{60}$ and the balance is of higher molecular weight fullerene materials.

127. The method of claim 126 wherein the higher molecular weight fullerene material is principally $C_{70}$.

128. The method of claim 127 wherein the stored gas is oxygen.

129. The method of claim 127, wherein the stored gas is hydrogen.

130. The method of claim 127, wherein the stored gas is carbon dioxide.

131. The method of claim 127 wherein the stored gas is nitrogen.

132. The method of claim 126 wherein the stored gas is oxygen.

133. The method of claim 126, wherein the stored gas is hydrogen.

134. The method of claim 126, wherein the stored gas is carbon dioxide.

135. The method of claim 126 wherein the stored gas is nitrogen.

136. The method of claim 1 wherein the stored gas is oxygen.

137. The method of claim 1, wherein the stored gas is hydrogen.

138. The method of claim 1, wherein the stored gas is carbon dioxide.

139. The method of claim 1 wherein the stored gas is nitrogen.

140. The method of claim 1 wherein the stored gas is water vapor.

141. An adsorbent suitable for storing a gas comprising a pelletized fullerene material having a bulk density of at least 1.4 grams per cubic centimeter.

142. An adsorbent as defined in claim 141, further characterized as being oxidized and non-polymerized.

143. An adsorbent as defined in claim 141, further characterized by the presence of two-dimensional fullerene-1,4-phenylenediamine polymer structure formed with the fullerene material.

144. An adsorbent as defined in claim 141, further characterized by the presence of a two-dimensional fullerene-hexamethylenediamine polymer structure formed with the fullerene material.

145. A storage unit for a gas such as oxygen, comprising a closed chamber suitable for maintaining a gas under pressure above ambient pressure, said chamber containing a body of gas adsorbent material consisting essentially of a fullerene-based material selected from the group consisting of pelletized fullerene, polymerized fullerene, and pelletized polymerized fullerene, and means for selectively accessing said chamber for introducing and withdrawing gas to be stored therein.

146. A storage unit as defined in claim 145, wherein the adsorbent consists essentially of pelletized polymerized fullerene material.

147. A storage unit as defined in claim 146, wherein the adsorbent consists essentially of pelletized polymerized fullerene material characterized by the presence of organic molecules attached to the fullerene molecule prior to polymerization.

148. A storage unit as defined by claim 147 wherein the organic molecules comprise 1,4-phenylenediamine (PDA) attached to the fullerene molecules, thereby forming a two-dimensional fullerene-PDA polymer structure.

149. A storage unit as defined in claim 145 wherein the adsorbent consists essentially of chemically activated, polymerized fullerene-based material.

150. A storage unit as defined in claim 149, wherein the chemical activation involves passing a gas over the polymerized fullerene-based material.

151. A storage unit as defined in claim 150 wherein the gas passed over the fullerene based material is selected from among carbon dioxide, ammonia, air and water vapor.

152. A gas storage system comprising a gas storage unit as defined in claim 145 having detachably coupled to the closed chamber thereof a low pressure oxygen concentrator for providing a source of oxygen gas to be stored in said unit.

153. The method of preparing a fullerene-based adsorbent suitable for storing a gas that comprises polymerizing a quantity of fullerene material, whereby the fullerene molecules of said material are denatured by breaking their molecular cage structure.

154. The method of claim 153 wherein the polymerizing process involves subjecting the fullerene material to heat in the presence of an inert atmosphere.

155. The method of claim 153 where in the fullerene material is reacted with organic molecules prior to polymerization, whereby the organic molecules are attached to the fullerenes.

156. The method of claim 155 wherein the fullerene material is reacted with 1,4-phenylenediamine (PDA) prior to polymerization, whereby a two-dimensional fullerene-PDA polymer structure is formed with the fullerene material.

157. The method of claim 156 wherein the fullerene material is pelletized to a bulk density of at least 1.4 grams per cubic centimeter prior to polymerization.

158. The method of claim 155 wherein the fullerene material is reacted with hexamethylenediamine (HMDA) prior to polymerization, whereby a fullerene-HMDA polymer structure is formed with fullerene material.

159. The method of claim 158 wherein the fullerene material is pelletized to a bulk density of at least 1.4 grams per cubic centimeter prior to polymerization.

160. The method of claim 155 wherein the fullerene material is pelletized to a bulk density of at least 1.4 grams per cubic centimeter prior to polymerization.

161. The method of claim 153 wherein the polymerized fullerene-based material is subjected to chemical activation, thereby generating additional micropores for increased gas adsorption capacity.

162. The method of claim 161 wherein the chemical activation involves passing a gas over the polymerized fullerene-based material at elevated temperature.

163. The method of claim 162 wherein the gas is selected from among carbon dioxide, ammonia, air and water vapor.

164. The method of claim 163 wherein the elevated temperature is in the range of 350° C.–850° C.

165. The method of claim 164, wherein the polymerizing process involves subjecting the fullerene material to heat at 900° C. in the presence of an inert gas and wherein the activation process involves passing carbon dioxide gas over the polymerized fullerene material at a temperature of 850° C. for a period of four hours.

166. The method of claim 163, wherein the polymerizing process involves subjecting the fullerene material to heat at 900° C. in the presence of an inert gas and wherein the activation process involves passing carbon dioxide gas over the polymerized fullerene material at a temperature of 850° C. for a period of four hours.

167. The method of claim 162 wherein the fullerene material is pelletized to a bulk density of at least 1.4 grams per cubic centimeter prior to polymerization.

168. The method of claim 162, wherein the polymerizing process involves subjecting the fullerene material to heat at 900° C. in the presence of an inert gas and wherein the activation process involves passing carbon dioxide gas over the polymerized fullerene material at a temperature of 850° C. for a period of four hours.

169. The method of claim 161 wherein the fullerene material is pelletized to a bulk density of at least 1.4 grams per cubic centimeter prior to polymerization.

170. The method of claim 161, wherein the polymerizing process involves subjecting the fullerene material to heat at 900° C. in the presence of an inert gas and wherein the activation process involves passing carbon dioxide gas over the polymerized fullerene material at a temperature of 850° C. for a period of four hours.

171. The method of claim 153 wherein the fullerene material is pelletized to a bulk density of at least 1.4 grams per cubic centimeter prior to polymerization.

172. The method of claim 153, wherein the fullerene molecules of said fullerene material are reacted to oxygen molecules prior to polymerization, whereby the oxygen molecules are attached to the fullerene molecules, thereby increasing their gas adsorption capacity.

173. The method of claim 172, wherein the polymerized fullerene-based material is subjected to chemical activation, thereby generating additional micropores for increased gas adsorption capacity.

174. The method of preparing an adsorbent suitable for storing a gas that comprises: providing a quantity of fullerene material, pelletizing the fullerene material to bulk density of at least 1.4 grams per cubic centimeter.

175. The method of claim 174, wherein the fullerene material is subjected to a pre-chemical treatment under conditions that will not polymerize the fullerene material and wherein the chemically treated fullerene material is subjected to activation by exposing it to carbon dioxide gas at a temperature in excess of 900° C. while under pressure below that which will polymerize the chemically treated fullerene material.

176. The method of claim 175, wherein the pre-chemical treatment comprises oxidizing the fullerene material by exposing it to oxygen at elevated temperatures and pressure below that which will polymerize it.

177. The method of claim 175, wherein the pre-chemical treatment comprises reacting the fullerene material with 1,4-phenylenediamine (PDA), whereby a two-dimensional fullerene-PDA polymer structure is formed with the fullerene material.

178. The method of claim 175, wherein the pre-chemical treatment comprises reacting the fullerene material with hexamethylenediamine (HMDA), whereby a two-dimensional fullerene-HMDA polymer structure is formed with the fullerene material.

179. The method of claim 178, wherein the fullerene material is subjected to the pre-chemical treatment prior to pelletization of the fullerene material.

180. The method of claim 175, wherein the fullerene material is dissolved in an organic solvent prior to pre-chemical modification, wherein the pre-chemical modification involves combining the thus formed fullerene solution with a diamine to modify the fullerene material, precipitating the modified fullerene material from the solution, and pelletizing the precipitated modified fullerene material.

* * * * *